United States Patent
Olesen et al.

(10) Patent No.: US 12,451,932 B2
(45) Date of Patent: Oct. 21, 2025

(54) APPARATUS, METHOD, COMPUTER PROGRAM FOR REPEATING SIGNALS

(71) Applicant: Nokia Solutions and Networks Oy, Espoo (FI)

(72) Inventors: Poul Olesen, Stoevring (DK); Simon Svendsen, Aalborg (DK); Axel Mueller, Massy (FR); Ali Karimidehkordi, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/392,778

(22) Filed: Dec. 21, 2023

(65) Prior Publication Data
US 2024/0214036 A1    Jun. 27, 2024

(30) Foreign Application Priority Data
Dec. 23, 2022  (EP) ................................ 22216624

(51) Int. Cl.
*H04B 7/0408* (2017.01)

(52) U.S. Cl.
CPC ................. *H04B 7/0408* (2013.01)

(58) Field of Classification Search
CPC .... H04B 7/15507; H04B 7/14; H04B 7/0408; H04B 7/026; H04B 7/155; H04W 8/047
See application file for complete search history.

(56) References Cited

U.S. PATENT DOCUMENTS

| | | | |
|---|---|---|---|
| 2002/0018483 A1* | 2/2002 | Kuwabara | H04L 27/2647 370/430 |
| 2011/0267976 A1* | 11/2011 | Oodachi | H04B 7/1555 370/252 |
| 2012/0057619 A1* | 3/2012 | Shen | H04B 7/15535 375/211 |
| 2012/0128038 A1* | 5/2012 | Crilly, Jr. | H04B 7/10 375/211 |
| 2013/0094522 A1* | 4/2013 | Moshfeghi | H04B 7/0689 370/498 |
| 2014/0219124 A1* | 8/2014 | Chang | H04B 7/0413 370/252 |
| 2016/0360489 A1* | 12/2016 | Boodannavar | H04B 7/0413 |
| 2018/0294866 A1* | 10/2018 | Ashworth | H04B 7/15507 |
| 2018/0294867 A1* | 10/2018 | Schwab | H04B 7/15557 |
| 2022/0069895 A1* | 3/2022 | Maltsev | H04B 7/10 |
| 2023/0361855 A1* | 11/2023 | Hatamian | H04B 7/15507 |

* cited by examiner

*Primary Examiner* — Sophia Vlahos
(74) *Attorney, Agent, or Firm* — HARNESS, DICKEY & PIERCE, P.L.C.

(57) ABSTRACT

In one embodiment, an apparatus performs receiving, via two different signal pathways, at least two different signals that are associated with different radio wave characteristics; changing the frequency of signal(s) to provide intermediate signal(s) with each having different frequencies; multiplexing the intermediate signals to allow signals to be transmitted together via a single wired connection; receiving a multiplexed signal via the single wired connection, the multiplexed signal including intermediate further signals having different frequencies, the intermediate further signals also being associated with differing radio wave characteristics; and separating the intermediate further signals into separate signals; changing the frequency of the further signals to provide further signals at a transmission frequency; and transmitting the further signals via the two signal pathways.

14 Claims, 5 Drawing Sheets

APPARATUS, METHOD, COMPUTER PROGRAM FOR REPEATING SIGNALS

CROSS-REFERENCE TO RELATED APPLICATIONS

This application claims priority to and the benefit of European Patent Application No. 22216624.1 filed on Dec. 23, 2022, the entire contents of each of which are incorporated herein by reference.

TECHNOLOGICAL FIELD

Examples of the disclosure relate to an apparatus, method, computer program for repeating signals. Some relate to a network-controlled beamforming repeater.

BACKGROUND

Signal repeaters can cause problems in relation to interference problems because of reflected signals.

It would be desirable to efficiently improve and/or enhance implementation and/or operation of a signal repeater.

BRIEF SUMMARY

According to various, but not necessarily all, embodiments there is provided an apparatus comprising:
  means for receiving, in a first signal pathway, at least a first signal at a receiving frequency and associated with a first radio wave characteristic;
  means for receiving, in a second signal pathway, at least a second signal at the receiving frequency and associated with a second, different radio wave characteristic;
  means for changing the frequency of at least one of the first and second signals to provide intermediate first and second signals such that the intermediate first and second signals have different frequencies;
  means for multiplexing the intermediate first and second signals to allow the intermediate first and second signals to be transmitted together via a single wired connection;
  means for receiving a multiplexed signal via the single wired connection, the multiplexed signal comprising intermediate third and fourth signals having different frequencies, the intermediate third signal associated with a third radio wave characteristic and the intermediate fourth signal associated with a fourth radio wave characteristic, different to the third radio wave characteristic; and
  means for separating the intermediate third and fourth signals into separate signals;
  means for changing the frequency of at least one of the intermediate third and fourth signals to provide third and fourth signals at a transmission frequency;
  means for transmitting, in the first signal pathway, the third signal; and
  means for transmitting, in the second signal pathway, the fourth signal.

In some examples, the receiving frequency is in the range 21 GHz to 71 GHZ, and wherein the means for changing the frequency of at least one of the first and second signals is configured to:
  downconvert the first signal to a first intermediate frequency lower than the receiving frequency; and
  downconvert the second signal to a second intermediate frequency lower than the receiving frequency and different to the first intermediate frequency.

In some examples, the first and second intermediate frequencies are in the range 3 GHz to 10 GHz.

In some examples, the first radio wave characteristic comprises a first polarisation and the second, different radio wave characteristic comprises a second, different polarisation.

In some examples, the third radio wave characteristic comprises a first polarisation and the fourth radio wave characteristic comprises a second, different polarisation.

In some examples, the transmission frequency is in the range 21 GHz to 71 GHZ, and wherein the means for changing the frequency of at least one of the intermediate third and fourth signals is configured to:
  upconvert the frequency of the intermediate third signal to the transmission frequency; and
  upconvert the frequency of the intermediate fourth signal to the transmission frequency.

In some examples, the frequencies of the intermediate third and fourth signals are in the range 3 GHz to 10 GHz.

In some examples, the multiplexed signal comprises an oscillating signal and wherein the means for separating is configured to separate the intermediate third signal, the intermediate fourth signal, and the oscillating signal into separate signals.

In some examples, the apparatus comprises:
  means for providing an oscillating signal, wherein the means for multiplexing is configured to multiplex the oscillating signal, the intermediate first signal and the intermediate second signal to allow the oscillating signal, the intermediate first signal and the intermediate second signal to be transmitted together via the single wired connection.

According to various, but not necessarily all, embodiments there is provided a network-controlled repeater comprising:
  a backhaul unit; and
  an access unit, wherein the backhaul unit and the access unit are connected via a single wired connection;
  the backhaul unit comprising:
    means for receiving, in a first signal pathway, at least a first signal at a receiving frequency and associated with a first radio wave characteristic;
    means for receiving, in a second signal pathway, at least a second signal at the receiving frequency and associated with a second, different radio wave characteristic;
    means for changing the frequency of at least one of the first and second signals to provide intermediate first and second signals such that the intermediate first and second signals have different frequencies;
    means for multiplexing the intermediate first and second signals to allow the intermediate first and second signals to be transmitted together to the access unit via the single wired connection;
    means for receiving a multiplexed signal from the access unit via the single wired connection, the multiplexed signal comprising intermediate third and fourth signals having different frequencies, the intermediate third signal associated with a third radio wave characteristic and the intermediate fourth signal associated with a fourth radio wave characteristic, different to the third radio wave characteristic; and means for separating the intermediate third and fourth signals into separate signals;

means for changing the frequency of at least one of the intermediate third and fourth signals to provide third and fourth signals at a transmission frequency;

means for transmitting, in the first signal pathway, the third signal; and means for transmitting, in the second signal pathway, the fourth signal;

the access unit comprising:

means for receiving, in a third signal pathway, at least a third signal at a receiving frequency and associated with a third radio wave characteristic;

means for receiving, in a fourth signal pathway, at least a fourth signal at the receiving frequency and associated with a fourth, radio wave characteristic different to the third radio wave characteristic;

means for changing the frequency of at least one of the third and fourth signals to provide intermediate third and fourth signals such that the intermediate third and fourth signals have different frequencies;

means for multiplexing the intermediate third and fourth signals to allow the intermediate third and fourth signals to be transmitted together to the backhaul unit via the single wired connection;

means for receiving a multiplexed signal from the backhaul unit via the single wired connection, the multiplexed signal comprising intermediate first and second signals having different frequencies, the intermediate first signal associated with a first radio wave characteristic and the intermediate second signal associated with a second radio wave characteristic, different to the first radio wave characteristic; and means for separating the intermediate first and second signals into separate signals;

means for changing the frequency of at least one of the intermediate first and second signals to provide first and second signals at a transmission frequency;

means for transmitting, in the third signal pathway, the first signal; and means for transmitting, in the fourth signal pathway, the second signal.

In some examples, the single wired connection is a single coaxial cable.

In some examples, the access unit comprises means for providing an oscillating signal, wherein the means for multiplexing of the access unit is configured to multiplex the oscillating signal, the intermediate third signal and the intermediate fourth signal to allow the oscillating signal, the intermediate third signal and the intermediate fourth signal to be transmitted to the backhaul unit together via the single wired connection.

In some examples, the backhaul unit is configured to be positioned outside a building and the access unit is configured to be positioned inside the building.

According to various, but not necessarily all, embodiments there is provided a method comprising:

receiving, in a first signal pathway, at least a first signal at a receiving frequency and associated with a first radio wave characteristic;

receiving, in a second signal pathway, at least a second signal at the receiving frequency and associated with a second, different radio wave characteristic;

changing the frequency of at least one of the first and second signals to provide intermediate first and second signals such that the intermediate first and second signals have different frequencies;

multiplexing the intermediate first and second signals to allow the intermediate first and second signals to be transmitted together via a single wired connection;

receiving a multiplexed signal via the single wired connection, the multiplexed signal comprising intermediate third and fourth signals having different frequencies, the intermediate third signal associated with a third radio wave characteristic and the intermediate fourth signal associated with a fourth radio wave characteristic, different to the third radio characteristic;

separating the intermediate third and fourth signals into separate signals;

changing the frequency of at least one of the intermediate third and fourth signals to provide third and fourth signals at a transmission frequency;

transmitting, in the first signal pathway, the third signal; and transmitting, in the second signal pathway, the fourth signal.

According to various, but not necessarily all, embodiments there is provided a computer program comprising instructions which, when executed by an apparatus, cause the apparatus to perform at least a part of one or more methods described herein.

According to various, but not necessarily all, examples there is provided examples as claimed in the appended claims.

According to various, but not necessarily all, embodiments there is provided an apparatus comprising at least one processor; and at least one memory including computer program code;

the at least one memory storing instructions that, when executed by the at least one processor, cause the apparatus at least to perform at least a part of one or more methods disclosed herein.

According to various, but not necessarily all, embodiments there is provided an apparatus comprising means for performing at least part of one or more methods disclosed herein.

The description of a function should additionally be considered to also disclose any means suitable for performing that function.

The description of any means suitable for performing a function and/or of any feature, and/or component, and/or structure, and/or device, and/or apparatus configured to perform a function should additionally be considered to disclose a method comprising performing the function.

For example, description of an apparatus configured to perform at least one function should also be considered to describe a method comprising performing the at least one function.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which.

DETAILED DESCRIPTION

The FIGs illustrate various examples of an apparatus 10. In at least some examples, the apparatus 10 is at least part of a signal repeater, for example a network-controlled repeater. The apparatus 10 can, for example, enable an efficient implementation of a signal repeater, such as a network-controlled repeater.

Figure 1:
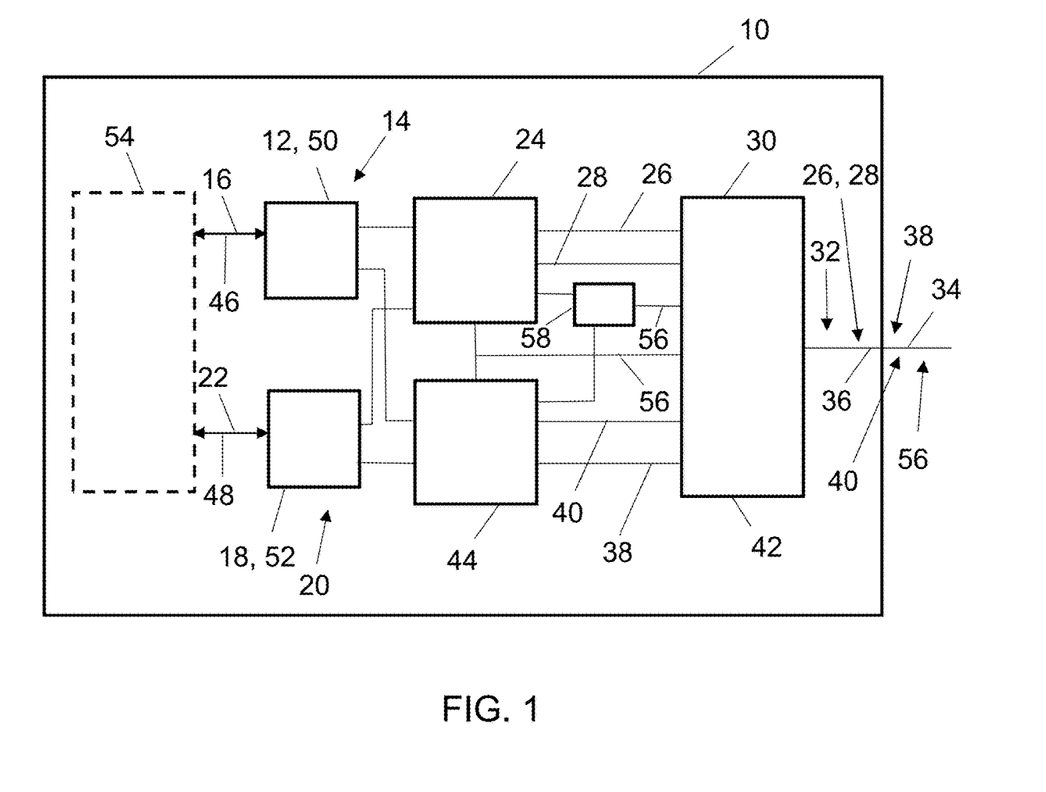
FIG. 1 shows an example of the subject matter described herein.

FIG. 1 schematically illustrates an example of an apparatus 10.

In examples, the apparatus 10 forms part of a device. In some examples, the apparatus 10 forms part of a signal repeater. In some examples, the apparatus 10 forms part of a network-controlled signal repeater The apparatus 10 comprises means 12 for receiving, in a first signal pathway 14, at least a first signal 16 at a receiving frequency and associated with a first radio wave characteristic.

The means 12 can comprise any suitable
means/structure(s)/arrangement(s)/component(s) configured to receive, in a first signal pathway 14, at least a first signal 16 at a receiving frequency and associated with a first radio wave characteristic.

In examples, the means 12 can be considered at least one receiver, at least one receiving arrangement, at least one receiving structure, at least one receiving component, receiving circuitry and so on.

In examples, the means 12 comprises at least one conductor, and/or at least one conductive path, and/or at least one conductive trace and so on.

In some examples, the means 12 comprises at least one antenna 54, for example at least one antenna array 54. The at least one antenna array 54 can comprise a beamforming antenna array 54.

In examples, the means 12 is configured to provide and/or define at least part of the first signal pathway 14.

The apparatus 10 can be considered to comprise a first signal pathway 14.

The receiving frequency can comprise any suitable frequency. For example, the receiving frequency can comprise any suitable frequency for use in a radio network. For example, the receiving frequency can comprise any suitable radio frequency. In some examples, the receiving frequency comprises a frequency in the new radio (NR) frequency Range Two (FR2).

In some examples, the receiving frequency is in the range 21 GHz to 71 GHz.

In some examples, the at least a first signal 16 can comprise or be considered a radio signal.

A radio characteristic can be considered any suitable characteristic of a radio signal. For example, a radio characteristic can be any characteristic associated with and/or related to, and/or descriptive of a radio signal other than its radio frequency.

The first radio characteristic can comprise any suitable radio characteristic. For example, the first radio characteristic can comprise a polarisation.

The at least a first signal 16 can be considered to be associated with the first radio characteristic because the at least a first signal 16 comprises and/or results from, and/or is caused by, a radio signal having the first radio characteristic.

In the illustrated example, the apparatus 10 comprises means 18 for receiving, in a second signal pathway 20, at least a second signal 22 at the receiving frequency and associated with a second, different radio wave characteristic.

The means 18 can comprise any suitable means/structure(s)/arrangement(s)/component(s) configured to receive, in a second signal pathway 20, at least a second signal 22 at the receiving frequency and associated with a second, different radio wave characteristic.

In examples, the means 18 can be considered at least one receiver, at least one receiving arrangement, at least one receiving structure, at least one receiving component, receiving circuitry and so on.

In examples, the means 18 comprises at least one conductor, and/or at least one conductive path, and/or at least one conductive trace and so on.

In some examples, the means 18 comprises at least one antenna 54, for example at least one antenna array 54. The at least one antenna array 54 can comprise a beamforming antenna array 54.

In examples, the means 18 is configured to provide and/or define at least part of the second signal pathway 20.

The apparatus 10 can be considered to comprise a second signal pathway 20.

In examples, the first signal pathway 14 and the second signal pathway 20 are different signal pathways.

In some examples, the first signal pathway 14 and the second signal pathway 20 share a portion of a signal pathway. For example, the first signal pathway 14 and the second signal pathway can share at least one component, for example, at least one conductive path, and/or at least one antenna 54, for example at least one antenna array 54 and so on.

In some examples, the at least a second signal 22 can comprise or be considered a radio signal.

The second, different radio characteristic can comprise any suitable radio characteristic different to the first radio characteristic. For example, the second, different radio characteristic can comprise a polarisation different or orthogonal to the polarisation associated with the at least a first signal 16.

The at least a second signal 22 can be considered to be associated with the second, different radio characteristic because the at least a second signal 22 comprises and/or results from, and/or is caused by, a radio signal having the second, different radio characteristic.

In some examples, the first radio wave characteristic comprises a first polarisation and the second, different radio wave characteristic comprises a second, different polarisation. For example, the first radio wave characteristic can comprise horizontal polarisation and the second, different radio wave characteristic can comprise vertical polarisation.

In the illustrated example, the apparatus 10 comprises means 24 for changing the frequency of at least one of the first and second signals 16, 22 to provide intermediate first and second signals 26, 28 such that the intermediate first and second signals 26, 28 have different frequencies.

The means 24 can comprise any suitable
means/structure(s)/arrangement(s)/component(s) configured to change the frequency of at least one of the first and second signals 16, 22 to provide intermediate first and second signals 26, 28 such that the intermediate first and second signals 26, 28 have different frequencies.

In examples, the means 24 can be considered at least one converter, at least one converting arrangement, at least one converting structure, at least one converting component, converting circuitry, at least one mixer, at least one downconverter, at least one upconverter, at least one down conversion mixer, at least one up conversion mixer and so on.

The frequency of the first signal 16 and/or second signal 22 can be changed in any suitable way to provide intermediate first and second signals 26, 28 having any suitable different frequencies. For example, the frequency of the first signal 16 and/or second signal 22 can be changed in any suitable way to provide intermediate first and second signals 26, 28 that can be transmitted together via a single wired connection 34.

In some examples, the means 24 for changing the frequency of at least one of the first and second signals 16, 22 is configured to: downconvert the first signal 16 to a first intermediate frequency lower than the receiving frequency; and downconvert the second signal 22 to a second intermediate frequency lower than the receiving frequency and different to the first intermediate frequency.

Accordingly, in some examples, the receiving frequency is in the range 21 GHz to 71 GHZ, and the means 24 for changing the frequency of at least one of the first and second signals 16, 22 is configured to: downconvert the first signal 16 to a first intermediate frequency lower than the receiving frequency; and downconvert the second signal 22 to a second intermediate frequency lower than the receiving frequency and different to the first intermediate frequency.

In some examples, the first and second intermediate frequencies are in the range 3 GHz to 10 GHz.

The intermediate first and second frequencies can have any suitable frequency separation. In some examples, the first and second intermediate frequencies are separated by at least 50 MHz.

In some examples, the first and second intermediate frequencies are separated by 50 MHz to 1 GHz.

In some examples, the first and second intermediate frequencies are separated by greater than 1 GHz.

In the illustrated example, the apparatus 10 comprises means 30 for multiplexing the intermediate first and second signals 26, 28 to allow the intermediate first and second signals 26, 28 to be transmitted together via a single wired connection 34.

The means 30 can comprise any suitable
means/structure(s)/arrangement(s)/component(s) configured to multiplex the intermediate first and second signals 26, 28 to allow the intermediate first and second signals 26, 28 to be transmitted together via a single wired connection 34.

In examples, the means 30 can be considered at least one multiplexer, at least one multiplexing arrangement, at least one multiplexing structure, at least one multiplexing component, multiplexing circuitry and so on.

In examples, the means 30 comprises at least one filter bank.

Transmitting the intermediate first and second signals 26, 28 together via a single wired connection 34 can be considered transmitting the intermediate first and second signals 26, 28 at the same time, and/or in, at least, overlapping time periods, using the single wired connection 34.

The single wired connection 34 can comprise any suitable wired connection. In examples, the single wired connection 34 comprises or is a single coaxial cable.

In the illustrated example, the apparatus 10 comprises means 32 for receiving a multiplexed signal 36 via the single wired connection 34, the multiplexed signal 36 comprising intermediate third and fourth signals 38, 40 having different frequencies, the intermediate third signal 38 associated with a third radio wave characteristic and the intermediate fourth signal 40 associated with a fourth radio wave characteristic, different to the third radio wave characteristic.

The means 32 can comprise any suitable
means/structure(s)/arrangement(s)/component(s) configured to receive a multiplexed signal 36 comprising intermediate third and fourth signals 38, 40 having different frequencies, the intermediate third signal 38 associated with a third radio wave characteristic and the intermediate fourth signal 40 associated with a fourth radio wave characteristic, different to the third radio wave characteristic.

In examples, the means 32 can be considered at least one receiver, at least one receiving arrangement, at least one receiving structure, at least one receiving component, receiving circuitry and so on.

In examples, the means 32 comprises at least one conductor, and/or at least one conductive path, and/or at least one conductive trace and so on.

In examples, the means 32 comprises the single wired connection 34.

The intermediate third and fourth signals 38, 40 can have any suitable frequencies. For example, the intermediate third and fourth signals 38, 40 can have any suitable frequencies to allow the intermediate third and fourth signals 38, 40 to be transmitted together via a single wired connection 34.

It can be considered that the intermediate third signal 38 has a third intermediate frequency and the intermediate fourth signal 40 has a fourth intermediate frequency.

The first and second intermediate frequencies can be the same as, or similar to the third and fourth intermediate frequencies.

In some examples, the frequencies of the intermediate third and fourth signals 38, 40 are in the range 3 GHz to 10 GHz.

The intermediate third and fourth signals 38, 40 can have any suitable frequency separation. In some examples, the intermediate third and fourth signals 38, 40 are separated by at least 50 MHz.

In some examples, the intermediate third and fourth signals 38, 40 are separated by 50 MHz to 1 GHz.

In some examples, the intermediate third and fourth signals 38, 40 separated by greater than 1 GHz.

The third radio characteristic can comprise any suitable radio characteristic. For example, the first radio characteristic can comprise a polarisation.

The intermediate third signal 38 can be considered to be associated with the third radio characteristic because the intermediate third signal 38 comprises and/or results from, and/or is caused by, a radio signal having the third radio characteristic.

The fourth radio characteristic can comprise any suitable radio characteristic different to the third radio characteristic. For example, the fourth radio characteristic can comprise a polarisation different to a polarisation associated with the intermediate third signal 38.

The fourth intermediate signal 40 can be considered to be associated with the fourth radio characteristic different to the third radio characteristic because the intermediate fourth signal 40 comprises and/or results from, and/or is caused by, a radio signal having the fourth radio characteristic.

The third and fourth radio characteristics can be the same as the first and second radio characteristics.

In some examples, the third radio wave characteristic comprises a first polarisation and the fourth radio wave characteristic comprises a second, different polarisation. For example, the third radio wave characteristic can comprise horizontal polarisation and the fourth radio wave characteristic can comprise vertical polarisation.

The multiplexed signal 36 can be received from a similar apparatus 10. See, for example, FIG. 2.

In the illustrated example, the apparatus 10 comprises means 42 for separating the intermediate third and fourth signals 38, 40 into separate signals.

The means 42 can comprise any suitable means/structure(s)/arrangement(s)/component(s) configured to separate the intermediate third and fourth signals 38, 40 into separate signals.

In examples, the means 42 can be considered at least one separator, at least one separating arrangement, at least one separating structure, at least one separating component, separating circuitry and so on.

In examples, the means 42 can be considered at least one demultiplexer, at least one demultiplexing arrangement, at least one demultiplexing structure, at least one demultiplexing component, demultiplexing circuitry and so on.

In examples, the means 42 comprises at least one filter bank.

The means 42 for separating the intermediate third and fourth signals 38, 40 can be considered means 42 for separating the received multiplexed signal 36 into separate intermediate third and fourth signals 38, 40.

In some examples, the means 42 for separating the intermediate third and fourth signals 38, 40 into separate signals is integrated with and/or shares at least one component with the means 30 for multiplexing the intermediate first and second signals 26, 28.

Accordingly, in some examples, the means 30 for multiplexing the intermediate first and second signals 26, 28 is also for demultiplexing the received multiplexed signal 36.

Accordingly, in some examples, the means 30 for multiplexing can also be considered means for demultiplexing.

In some examples, the multiplexed signal 36 comprises an oscillating signal 56 and the means 42 for separating is configured to separate the intermediate third signal 38, the intermediate fourth signal 40, and the oscillating signal 56 into separate signals.

In examples, the received oscillating signal 56 can be provided to the means 24 for changing the frequency of at least one of the first and second signals 16, 22 and to the means 44 for changing the frequency of at least one of the intermediate third and fourth signals 38, 40, for use in the changing of the frequencies.

As used herein, separating, for example, the intermediate third and fourth signals 38, 40 into separate signals does not necessarily mean providing completely separate and/or isolated signals. That is, in examples, separation of the multiplexed signal 36 into the separate intermediate third and fourth signals 38, 40 may not be perfect.

For example, isolation between the two signals can have any suitable value to allow operation of the apparatus. For example, isolation between the two signals can be in the range 15 dB to 35 dB. For example, isolation between the two signals can be approximately 30 dB.

In the illustrated example, the apparatus 10 comprises means 44 for changing the frequency of at least one of the intermediate third and fourth signals 38, 40 to provide third and fourth signals 46, 48 at a transmission frequency.

The means 44 can comprise any suitable
means/structure(s)/arrangement(s)/component(s) configured to change the frequency of at least one of the intermediate third and fourth signals 38, 40 to provide third and fourth signals 46, 48 at a transmission frequency.

In examples, the means 44 can be considered at least one converter, at least one converting arrangement, at least one converting structure, at least one converting component, converting circuitry, at least one mixer, at least one downconverter, at least one upconverter, at least one down conversion mixer, at least one up conversion mixer and so on.

The frequency of the intermediate third signal 38 and/or intermediate fourth signal 40 can be changed in any suitable way to provide third and fourth signals 46, 48 at a transmission frequency.

In some examples, the means 44 for changing the frequency of at least one of the intermediate third and fourth signals 38, 40 is configured to: upconvert the frequency of the intermediate third signal 38 to the transmission frequency and upconvert the frequency of the intermediate fourth signal 40 to the transmission frequency.

The transmission frequency can comprise any suitable frequency. For example, the transmission frequency can comprise any suitable frequency for use in a radio network. For example, the transmission frequency can comprise any suitable radio frequency. In some examples, the transmission frequency comprises a frequency in the new radio (NR) frequency Range Two (FR2).

In some examples, the transmission frequency is in the range 21 GHz to 71 GHz. In some examples, the transmission frequency is substantially the same as the receiving frequency.

In some examples, the third signal 46 can comprise or be considered a radio signal.

In some examples, the fourth signal 48 can comprise or be considered a radio signal.

Accordingly, in some examples, the transmission frequency is in the range 21 GHz to 71 GHZ, and the means 44 for changing the frequency of at least one of the intermediate third and fourth signals 38, 40 is configured to: upconvert the frequency of the intermediate third signal 38 to the transmission frequency and upconvert the frequency of the intermediate fourth signal 40 to the transmission frequency.

In the illustrated example, the apparatus 10 comprises means 50 for transmitting, in the first signal pathway 14 the third signal 46.

The means 50 can comprise any suitable means/structure(s)/arrangement(s)/component(s) configured to transmit, in the first signal pathway 14, the third signal 46.

In examples, the means 50 can be considered at least one transmitter, at least one transmitting arrangement, at least one transmitting structure, at least one transmitting component, transmitting circuitry and so on.

In examples, the means 50 comprises at least one conductor, and/or at least one conductive path, and/or at least one conductive trace and so on.

In some examples, the means 50 comprises at least one antenna 54, for example at least one antenna array 54. The at least one antenna array 54 can comprise a beamforming antenna array 54.

In examples, the means 50 is configured to provide and/or define at least part of the first signal pathway 14.

In some examples, the means 50 for transmitting, in the first signal pathway 14, the third signal 46 is integrated with and/or shares at least one component with the means 12 for receiving, in the first signal pathway 14, at least a first signal 16.

The third signal 46 can be associated with the third radio wave characteristic. In examples, the third signal 46 can be transmitted by at least one antenna 54 as a radio signal having the third radio wave characteristic.

In the illustrated example, the apparatus 10 comprises means 52 for transmitting, in the second signal pathway 20, the fourth signal 48.

Consequently, FIG. 1 illustrates an apparatus 10 comprising:
  means 12 for receiving, in a first signal pathway 14, at least a first signal 16 at a receiving frequency and associated with a first radio wave characteristic;
  means 18 for receiving, in a second signal pathway 20, at least a second signal 22 at the receiving frequency and associated with a second, different radio wave characteristic;
  means 24 for changing the frequency of at least one of the first and second signals 16, 22 to provide intermediate first and second signals 26, 28 such that the intermediate first and second signals 26, 28 have different frequencies;
  means 30 for multiplexing the intermediate first and second signals 26, 28 to allow the intermediate first and second signals 26, 28 to be transmitted together via a single wired connection 34;
  means 32 for receiving a multiplexed signal 36 via the single wired connection 34, the multiplexed signal 36 comprising intermediate third and fourth signals 38, 40 having different frequencies, the intermediate third signal 38 associated with a third radio wave characteristic and the intermediate fourth signal 40 associated with a fourth radio wave characteristic, different to the third radio wave characteristic; and
  means 42 for separating the intermediate third and fourth signals 38, 40 into separate signals;
  means 44 for changing the frequency of at least one of the intermediate third and fourth signals 38, 40 to provide third and fourth signals 46, 48 at a transmission frequency;
  means 50 for transmitting, in the first signal pathway 14, the third signal 46; and
  means 52 for transmitting, in the second signal pathway 20, the fourth signal 48.

The means 52 can comprise any suitable means/structure(s)/arrangement(s)/component(s) configured to transmit, in the second signal pathway 20, the fourth signal 48.

In examples, the means 52 can be considered at least one transmitter, at least one transmitting arrangement, at least one transmitting structure, at least one transmitting component, transmitting circuitry and so on.

In examples, the means 52 comprises at least one conductor, and/or at least one conductive path, and/or at least one conductive trace and so on.

In some examples, the means 52 comprises at least one antenna 54, for example at least one antenna array 54. The at least one antenna array 54 can comprise a beamforming antenna array 54.

In examples, the means 52 is configured to provide and/or define at least part of the second signal pathway 20.

In some examples, the means 52 for transmitting, in the second signal pathway 20, the fourth signal 48 is integrated with and/or shares at least one component with the means 18 for receiving, in the second signal pathway 20, at least a second signal 22.

The fourth signal 48 can be associated with the fourth radio wave characteristic. In examples, the fourth signal 48 can be transmitted by at least one antenna 54 as a radio signal having the fourth radio wave characteristic.

In some examples, the apparatus 10 comprises means 58 for providing an oscillating signal 56, wherein the means 30 for multiplexing is configured to multiplex the oscillating signal 56, the intermediate first signal 26 and intermediate second signal 28 to allow the oscillating signal 56, the intermediate first signal 26 and the intermediate second signal 28 to be transmitted together via the single wired connection 34.

The means 58 can comprise any suitable means/structure(s)/arrangement(s)/component(s) configured to provide an oscillating signal 56.

In examples, the means 58 can be considered at least one oscillator, at least one oscillating arrangement, at least one oscillating structure, at least one oscillating component, oscillating circuitry and so on.

In examples, the means 58 comprises at least one crystal oscillator, and/or at least one phase locked loop and so on.

In examples, the oscillating signal 56 is provided to a similar apparatus 10, along with the intermediate first and second signals 26, 28, for use by the similar apparatus 10. See, for example, FIG. 2.

In some examples, the apparatus 10 comprises at least one controller 830 (not illustrated in the example of FIG. 1) configured to control operation of the apparatus 10.

In examples, the apparatus 10 is configured to receive radio signals from and transmit radio signals to at least one network node, for example at least one gNodeB, and to operate on the received signals as described in relation to FIG. 1 and provide signals to a similar apparatus configured to receive radio signals from and transmit radio signals to at least one user equipment (UE).

In examples, the apparatus 10 is configured to receive radio signals from and transmit radio signals to at least one UE and to operate on the received signals as described in relation to FIG. 1 and provide signals to a similar apparatus configured to receive radio signals from and transmit radio signals to at least one network node, for example at least one gNodeB.

For example, the apparatus 10 can operate in downlink for radio signals received from a network node and provided for transmission to at least one UE, and in uplink for radio signals originated from a UE and transmitted to the network node.

In examples, for signals in a first direction, for example downlink, the apparatus 10 receives, in different signal pathways 14, 20, signals associated with different radio wave characteristics, for example different polarisations.

The apparatus 10 changes the frequency of at least one of the received signals to provide intermediate signals having 26, 28 different frequencies.

The apparatus 10 multiplexes the intermediate signals 26, 28 and provides the multiplexed signal 36 to a similar apparatus 10 via a single wired connection 34.

In examples, for signals in a second direction, for example uplink, the apparatus 10 receives, from a similar apparatus 10, a multiplexed signal 36 via the single wired connection 34.

The apparatus 10 separates the multiplexed signal 36 into separate intermediate signals 38, 40 and changes the frequency of at least one of the intermediate signals 38, 40 to provide signals 46, 48 at a transmission frequency.

The apparatus 10 transmits the signals 46, 48 in different signal pathways respectively.

In examples, the apparatus 10 is configured to operate with another similar apparatus 10 as at least part of a network-controlled repeater 68. See, for example, FIG. 2.

Figure 2:
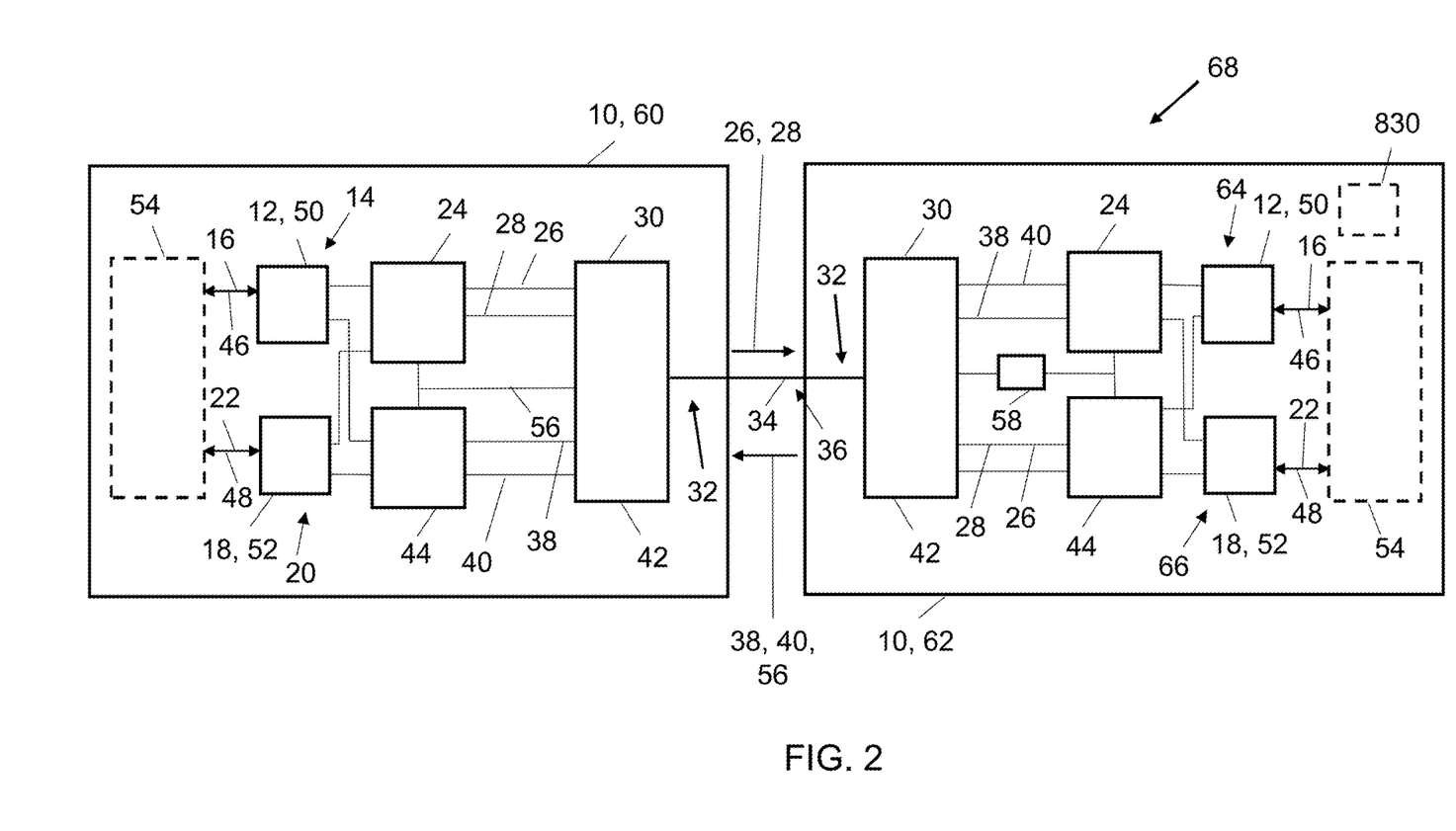
FIG. 2 shows another example of the subject matter described herein.

FIG. 2 schematically illustrates an example of a network-controlled repeater 68. The network-controlled repeater 68 can comprise a network-controlled beamforming repeater.

In the example of FIG. 2, the network-controlled repeater 68 comprises a backhaul unit 60 and an access unit 62 connected via a single wired connection 34.

The backhaul unit 60 is configured to receive signals from and transmit signals to at least one network node, for example at least one gNodeB.

The access unit 62 is configured to receive signals from and transmit signals to at least one UE.

The backhaul unit 60 comprises an apparatus 10 as described in relation to FIG. 1 and the access unit 62 comprises an apparatus 10 as described in relation to FIG. 1.

The backhaul unit 60 is configured to receive signals from a network and provide a multiplexed signal 34 to the access unit 62.

The access unit 62 is configured to receive signals from at least one UE and provide a multiplexed signal 34 to the backhaul unit 60.

Consequently, FIG. 2 illustrates a network-controlled repeater 68 comprising:
a backhaul unit 60; and
an access unit 62, wherein the backhaul unit 60 and the access unit 62 are connected via a single wired connection 34;
the backhaul unit 60 comprising:
  means 12 for receiving, in a first signal pathway 14, at least a first signal 16 at a receiving frequency and associated with a first radio wave characteristic;
  means 18 for receiving, in a second signal pathway 20, at least a second signal 22 at the receiving frequency and associated with a second, different radio wave characteristic;
  means 24 for changing the frequency of at least one of the first and second signals 16, 22 to provide intermediate first and second signals 26, 28 such that the intermediate first and second signals 26, 28 have different frequencies;
  means 30 for multiplexing the intermediate first and second signals 26, 28 to allow the intermediate first and second signals 26, 28 to be transmitted together to the access unit 62 via the single wired connection 34;
  means 32 for receiving a multiplexed signal 36 from the access unit 62 via the single wired connection 34, the multiplexed signal 36 comprising intermediate third and fourth signals 38, 40 having different frequencies, the intermediate third signal 38 associated with a third radio wave characteristic and the intermediate fourth signal 40 associated with a fourth radio wave characteristic, different to the third radio wave characteristic; and
  means 42 for separating the intermediate third and fourth signals 38, 40 into separate signals;
  means 44 for changing the frequency of at least one of the intermediate third and fourth signals 38, 40 to provide third and fourth signals 46, 48 at a transmission frequency;
  means 50 for transmitting, in the first signal pathway 14, the third signal 46; and
  means 52 for transmitting, in the second signal pathway 20, the fourth signal 48;
the access unit 62 comprising:
  means 12 for receiving, in a third signal pathway 64, at least a third signal 46 at a receiving frequency and associated with a third radio wave characteristic;
  means 18 for receiving, in a fourth signal pathway 66, at least a fourth signal 48 at the receiving frequency and associated with a fourth, radio wave characteristic different to the third radio wave characteristic;
  means 24 for changing the frequency of at least one of the third and fourth signals 46, 48 to provide intermediate third and fourth signals 38, 40 such that the intermediate third and fourth signals 38, 40 have different frequencies;
  means 30 for multiplexing the intermediate third and fourth signals 38, 40 to allow the intermediate third and fourth signals 38, 40 to be transmitted together to the backhaul unit 60 via the single wired connection 34;
  means 32 for receiving a multiplexed signal 36 from the backhaul unit 60 via the single wired connection 34, the multiplexed signal 36 comprising intermediate first and second signals 26, 28 having different frequencies, the intermediate first signal 26 associated with a first radio wave characteristic and the intermediate second signal 28 associated with a second radio wave characteristic, different to the first radio wave characteristic; and
  means 42 for separating the intermediate first and second signals 26, 28 into separate signals;
  means 44 for changing the frequency of at least one of the intermediate first and second signals 26, 28 to provide first and second signals 16, 22 at a transmission frequency;
  means 50 for transmitting, in the third signal pathway 64, the first signal 16; and
  means 52 for transmitting, in the fourth signal pathway 66, the second signal 22.

In the example of FIG. 2, the network-controlled repeater 68 comprises at least one controller 830 configured to control operation of the network-controlled repeater 68.

In the illustrated example, the at least one controller 830 is located in the access unit 62 and information, such as control information, can be transmitted between the backhaul unit 60 and the controller 830, and/or the access unit 62 and the controller 830.

In examples, control information received from a network can be provided to the controller 830 and the network-controlled repeater 68 controlled based, at least in part, on the control information received from the network.

In the example of FIG. 2, the single wired connection is a single coaxial cable.

In the example of FIG. 2, the access unit 62 comprises means 58 for providing an oscillating signal 56, wherein the means 30 for multiplexing of the access unit 62 is configured to multiplex the oscillating signal 56, the intermediate third signal 38 and the intermediate fourth signal 40 to allow the oscillating signal 56, the intermediate third signal 38 and the intermediate fourth signal 40 to be transmitted the backhaul unit 60 together via the single wired connection 34.

In the example of FIG. 2, the backhaul unit 60 is configured to be positioned outside a building and the access unit 62 is configured to be positioned inside the building.

This is advantageous as, for example, the means 58 for providing an oscillating signal 56 and/or the at least one controller 830 can be located in a more controlled, indoor environment with less variation of ambient temperature.

To aid understanding, some use cases are described.

Figure 3:
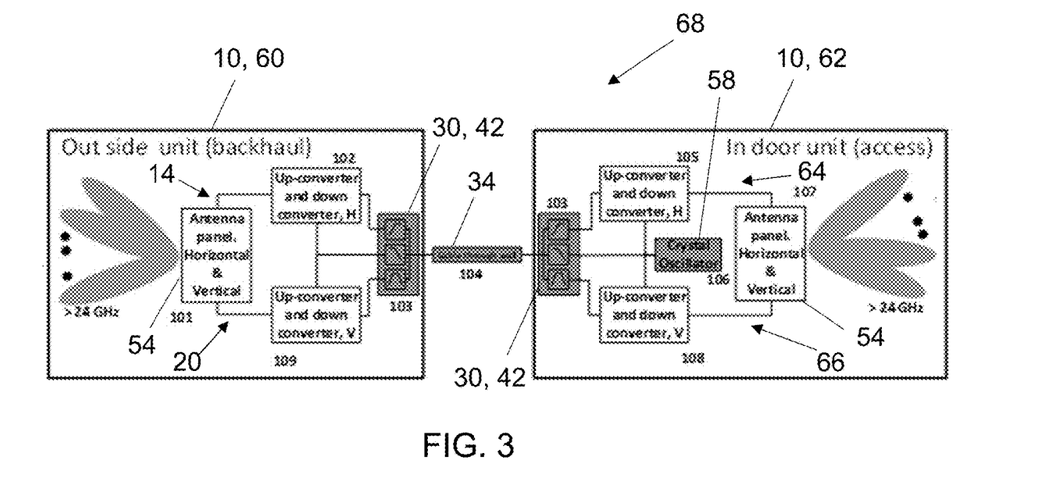
FIG. 3 shows another example of the subject matter described herein.

FIG. 3 illustrates an example of a network-controlled repeater 68.

Examples of the disclosure provide for a separated (outdoor and indoor) deployment for backhaul and access units 60, 62 by providing a solution that enables both two intermediate frequency (IF) signals, for example 26, 28, as well as the Crystal Reference Signal (CRS) 56 to be transferred through one single coax cable 34 (or similar) between the outside backhaul unit 60 and the inside access unit 62 of a network-controlled repeater 68.

FIG. 3 presents an example hardware implementation of a network-controlled repeater 68 where the two intermediate frequencies (IF), for example IFh and IFv being associated with horizontal and vertical polarizations, and the CRS 56 are isolated from each other by using triplexers 103 in backhaul and access units 60, 62. The triplexer 103 in FIG. 3 can represent at least a part of means 30 for multiplexing and/or means 42 for separating.

In examples, 30 dB isolation between IFh and IFv in the triplexers 103 is sufficient, as the practical cross-polarization isolation of the antenna panel 54 is not expected to be better than 20 to 30 dB.

The crystal oscillator 106 of FIG. 3 can represent at least part of the means 58 for providing an oscillating signal 56.

Placing the crystal oscillator 58 in the "inside" part of the hardware at room temperature (at about 15° C. to 35° C.)will limit temperature variations whereby cheaper hardware can be used, as frequency stability across a wider temperature range is known to be expensive.

Another advantage of using single CRS solution is that there is no frequency offset between the down converted and up converted signals since in the two network-controlled repeater units 60, 62, as all local oscillators/phase locked loops (PLL's) used for the up and down converters are locked to the same CRS.

The blocks/components that are shown in the example of FIG. 3 are described in the following:

101: Antenna panel that supports two polarizations and beamforming circuitry towards the gNodeB, backhaul connection. Antenna panel 101 can form at least part of at least one antenna 54.

107: Antenna panel that supports two polarizations (and beamforming circuitry towards user equipment, access connection. Antenna panel 107 can form at least part of at least one antenna 54.

102, 105, 108 & 109: Up-and-down converters that down converts (or up converts) the mm-Wave signal to an IF frequency at both horizontal and vertical polarizations.

The up-and-down converters 102, 105, 108, and 109 in FIG. 3 can form at least part of the means for changing 24, 44.

The frequency separation between IFh and IFv should be large enough (>=1 GHZ) to enable simple design of the triplexers 103. The IF frequencies IFh and IFv would be chosen between 3 to 10 GHz.

Single conversion architecture is illustrated; however dual conversion architecture can also be considered. A dual conversion architecture can potentially provide better frequency selectivity due to availability, and the nature of filter technology at various frequencies.

Examples of the disclosure provide for down converting horizontal and vertical polarizations from antenna panels to two different IF frequencies.

Examples of the disclosure provide for combining the two IF frequencies together with the crystal frequency by use of a triplexer into one cable.

Examples of the disclosure provide for the Intermediate (IF) signals as well as the Crystal Reference Signal (CRS) are transferred through one single coax cable between an outside unit (backhaul) and an Inside unit (access) in both directions.

Figure 4:
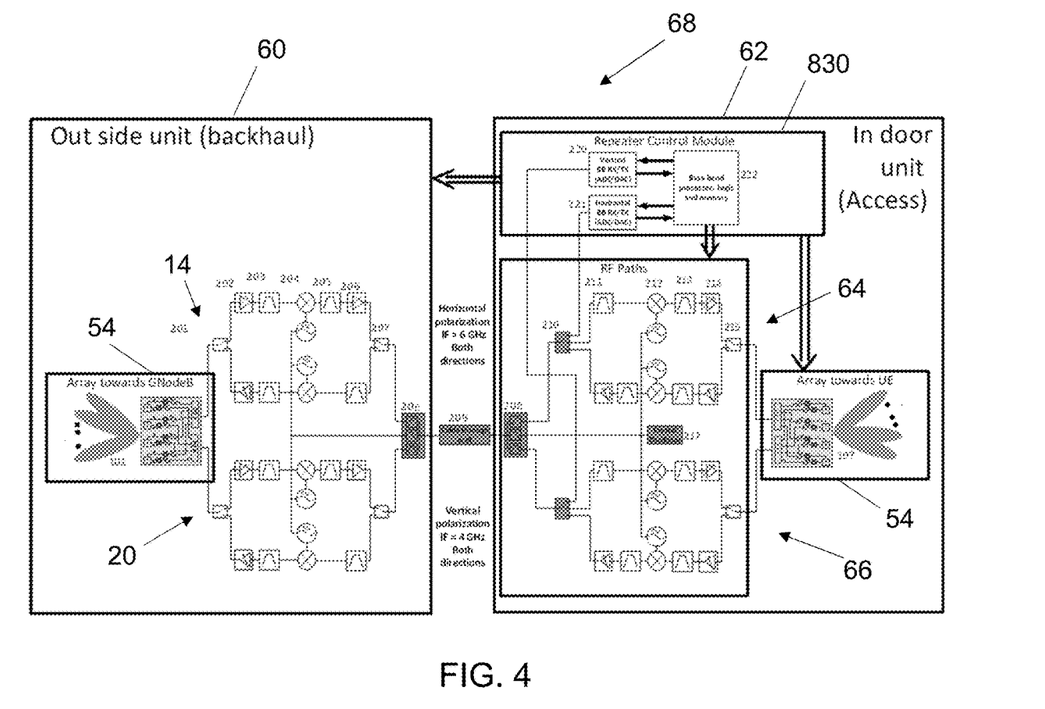
FIG. 4 shows another example of the subject matter described herein.

FIG. 4 illustrates an example of a network-controlled repeater 68, the radio frequency (RF) front ends of which are supporting multiple input multiple output (MIMO) in both directions. In the example of FIG. 4, four identically constructed RF chains combined with RF time division duplexing (TDD) switches are used to switch the direction of the RF signals.

Detailed individual blocks/components of examples of the disclosure are shown in FIG. 4 and described below. For the ease of description only one "chain" or path is described in detail, though the RF system of the network-controlled repeater 68 contains four identically constructed RF chains: two polarizations and a separate chain for each direction (uplink/downlink) in a time division duplexing (TDD) system.

201&215: TDD RF switches that switch the direction of the signal between up and down links, the control is performed from a control module/controller 830.

202: Adjustable amplifier with sufficiently low noise figure and adequate gain. Gain in this stage should be set adequately high and only be reduced in case of signals (wanted or interfering) that may drive the mixer or the intermediate frequency (IF) amplifier into a nonlinear operating point. To keep optimum low noise figure for the repeater at any time this amplifier should ideally not be used for ordinary gain control. Gain control is performed from the control module/controller 830.

203: mm-Wave bandpass filter that rejects RF and mm-Wave signals outside the supported frequency spectrum. The optimum characteristics of such filter depends on the selectivity and exact gain of the antenna module. Another option is to place it at the antenna module input/output in case the frequency selectivity of the antenna module is poor.

204: Down conversion mixer that translates the mm-Wave signal to an IF frequency. For example, 6 GHz is chosen for the horizontal polarization and 4 GHz for the vertical polarization. The down conversion mixer in the example of FIG. 4 can represent at least part of the means 24 for changing the frequency.

205: A function of the IF filter is to remove unintentional mixing products from the down conversion mixer and thereby protect the amplifier (206) from strong out-of-band signals that in turn may cause undesired nonlinear behaviour.

206: IF amplifier with built in gain control. Highest gain in the RF chain should be applied at the IF frequency and might be as high as 80 dB. Gain control to control stability and output power should mainly be done here, as it will cause minimum impact on noise figure and input linearity for the entire RF chain. Apart from maintaining the total repeater gain, another purpose of this stage is to overcome the RF loss in the cable (209) and the two triplexers (208). 80 dB gain may not practical due to stability concerns. A solution to this is to add an additional gain stage between 211 and 210.

207: TDD RF switch that switches the direction of the signal between up and down link. The control is performed from the control module.

208: Triplexer, a combination of three filters, which in some cases forms a single physical component. It can be designed as a combination of three band pass filters or as a low pass filter, band pass filter and a high pass filter depending on the exact requirements of the system. A duplex filter implementation is also valid if the CRS 56 itself is not transferred between the units 60, 62 but relies on using control and power supply interface. The triplexer 208 in the example of FIG. 4 can represent at least part of the means 30 for multiplexing.

209: Cable through the wall or window of a building, around a corner or between different floors in a multifloored building. A quite long cable can be used here if the gain in (206) is high enough. The cable 209 in the example of FIG. 4 can represent at least part of the single wired connection 34.

210: The purpose of this RF switch is TDD RF switch functionality at IF for the repeater functionality. It also enables the control module/controller 830 to make use of the backhaul or outside part of the repeater while disconnecting the fronthaul RF and mm-Wave circuitry.

211: IF band pass filter, this filter may be omitted in case the frequency selectivity of the two triplexers is sufficient. Combined selectivity of (205, 208 and 211) conditions the final bandwidth of the system. The IF filters (211) and (205) may be replaced by filter banks in case different bandwidth needs are to be supported. Such filter bank can help minimize amplification of RF noise adjacent to the allocated resource blocks (spectrum/bandwidth).

212: Up-conversion mixer that translates the IF signal to the transmission frequency. The up-conversion mixer 212 in the example of FIG. 4 can represent at least part of the means 44 for changing the frequency.

213: Band pass filter that removes unintentional mixing products such that undesired emissions caused by the up-conversion mixer are attenuated.

214: Power amplifier with gain control. Before maximum output power or maximum gain is reached should the gain be reduced in this stage to keep this stage within its linear range.

217: Crystal oscillator, the local oscillators controlled by the PLL's are all locked to the same reference. It may seem that the need for so many PLL's is problematic due to cost and required printed circuit board (PCB) area. However, this solution may in many cases be more efficient since distribution and needed buffering of high frequency signals around a PCB or a system on chip is likely to be more cumbersome to implement compared to this architecture due to mutual coupling between such local oscillator signals and basic loss across the board and therefore need for local oscillator (LO) buffering across the RF system. The crystal oscillator 217 in the example of FIG. 4 can represent at least part of the means 58 for providing an oscillating signal 56.

220 & 221: Control circuitry, could be analogue to digital converters (ADC's) and digital to analogue converters (DAC's) that operate directly at the RF frequency or more traditional receive and transmit architectures. Zero IF, low IF or heterodyne receive architectures, IQ transmit modulators and similar. An RX/TX switch may be inserted at the input (not illustrated).

222: Base band circuitry and control logic including firmware and required decoding, encoding, modulator and demodulator.

Figure 5:
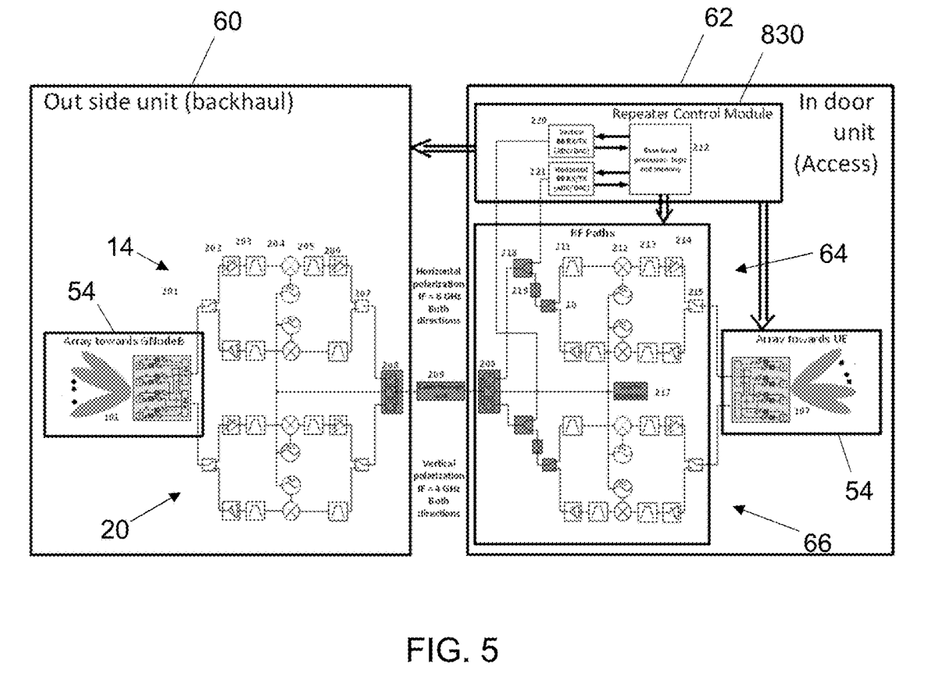
FIG. 5 shows another example of the subject matter described herein.

FIG. 5 illustrates another example of a network-controlled repeater 68.

FIG. 5 illustrates an example which is similar to the example of FIG. 4 and enables the control module/controller 830 to monitor the traffic.

218: Power splitter that directs the RF signals to the control module/controller 830 enabling the control module/controller 830 to be connected to the backhaul connection only when the switch (219) is in "off" state and isolate the signals from the front haul RF circuitry. This could be implemented as a resistive power splitter with even loss between the ports. Alternatively, a coupler or a circulator can be used. The best solution depends on exact and detailed level planning, gain distribution, component availability and cost trade-offs.

219: Switch that turns the front haul signals on or off allowing the control module to monitor the traffic in the repeater up- and down-link connections. This switch can be designed as an absorptive switch to ensure that the ports are always terminated into a 50-ohm load when the RF switch in "off" state.

All the RF switches (201, 207, 210, 215, 219) can be implemented as absorptive RF switches as it lowers the risk of unintentional oscillations, which is quite likely to due to very high potential gain of the system.

Figure 6:
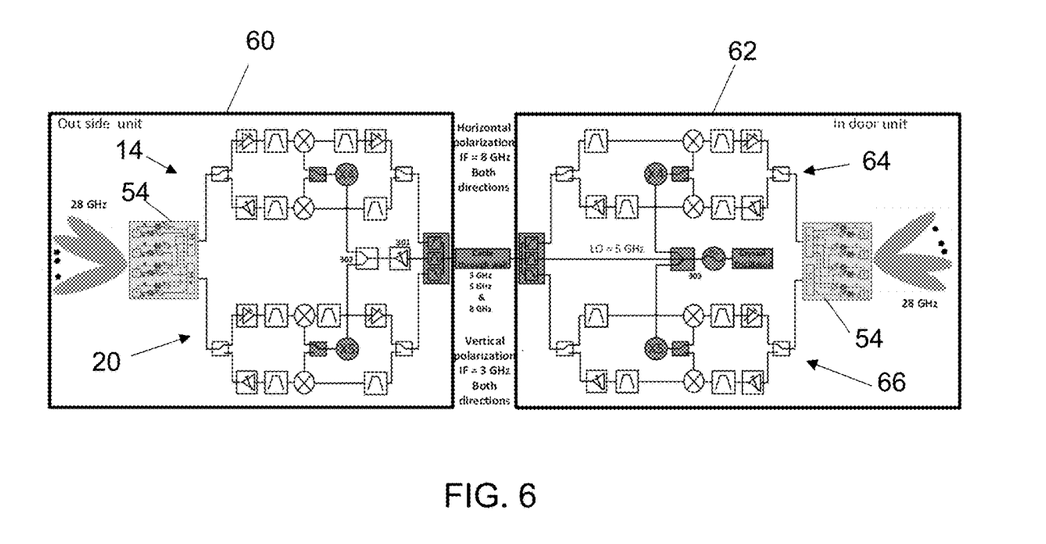
FIG. 6 shows another example of the subject matter described herein.

FIG. 6 illustrates another example of a network-controlled repeater 68.

In the example of FIG. 6, compared with the example of FIG. 4, multiple PLL's are replaced by one PLL, power splitters (302 & 303) and multipliers. The 5 GHz local oscillator signal is distributed through the cable and triplexers from the indoor unit into the outside unit. A LO buffer (301) with adjustable gain is included in the outside unit to support different cable lengths as the RF loss can vary a lot at 5 GHz depending on cable length and type of cable. An additional local oscillator (LO) buffer may be inserted between the power splitter (303) and the triplexer in case a support for very long cable is required as the cable loss may be so high such that that LO phase noise become a problem for the outside unit as there is a risk that amplification of thermal noise in the LO buffer (301) becomes a problem.

Figure 7:
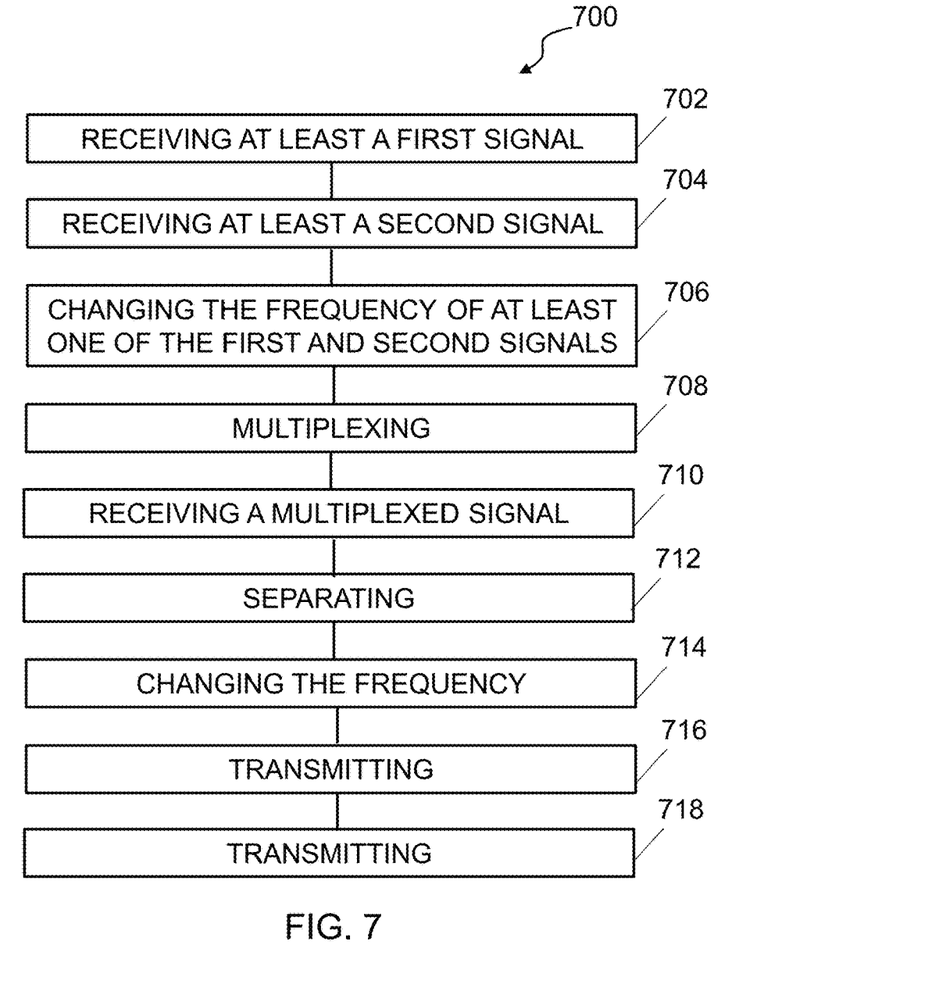
FIG. 7 shows another example of the subject matter described herein.

FIG. 7 illustrates an example of a method 700. In this example, but not necessarily all examples, the method 700 is a method operating a network-controlled repeater.

Method 700 can be performed by any suitable apparatus 10 comprising any suitable means.

At block 702, method 700 comprises receiving, in a first signal pathway 14, at least a first signal 16 at a receiving frequency and associated with a first radio wave characteristic.

At block 704, method 700 comprises receiving, in a second signal pathway 20, at least a second signal 22 at the receiving frequency and associated with a second, different radio wave characteristic.

At block 706, method 700 comprises changing the frequency of at least one of the first and second signals 16, 22 to provide intermediate first and second signals 26, 28 such that the intermediate first and second signals 26, 28 have different frequencies.

At block 708, method 700 comprises multiplexing the intermediate first and second signals 26, 28 to allow the intermediate first and second signals 26, 28 to be transmitted together via a single wired connection 34.

At block 710, method 700 comprises receiving a multiplexed signal 36 via the single wired connection 34, the multiplexed signal 36 comprising intermediate third and fourth signals 38, 40 having different frequencies, the intermediate third signal 38 associated with a third radio wave characteristic and the intermediate fourth signal 40 associated with a fourth radio wave characteristic, different to the third radio characteristic.

At block 712, method 700 comprises separating the intermediate third and fourth signals 38, 40 into separate signals.

At block 714, method 700 comprises changing the frequency of at least one of the intermediate third and fourth signals 38, 40 to provide third and fourth signals 46, 48 at a transmission frequency.

At block 716, method 700 comprises transmitting, in the first signal pathway 14, the third signal 46.

At block 718, method 700 comprises transmitting, in the second signal pathway 20, the fourth signal 48.

Examples of the disclosure are advantageous and provide technical benefits.

For example, examples of the disclosure enable a network-controlled repeater comprising two separate units for access and backhaul, both being connected by a single wired connection. This provides, for example, for efficient implementation and installation while separately located access and backhaul units, for example being separated by a wall, provide for reduced interference between access and backhaul signals.

For example, examples of the disclosure provide, for example, for a single oscillator within the access unit to be located inside a building and operating with a single oscillating signal.

For example, examples of the disclosure provide a hardware implementation solution for FR2 network-controlled repeaters that enables separate (outdoor and indoor) deployment of the backhaul and access arrays. In examples, the backhaul and access units are connected with IF signals through one single coax cable. In examples, a triplexer is used in each backhaul/access unit to combine vertical/horizontal polarization and CRS signals.

Examples of the disclosure benefit, for example, from low complexity and implementation cost, that enhances the performance of the repeater and avoids instability issues.

Examples of the disclosure can be applied, for example, for integrated access and backhaul (IAB) products and any other product where an RF unit outside as well as inside one is used to enhance coverage or provide broadband connections inside buildings.

Figure 8A:
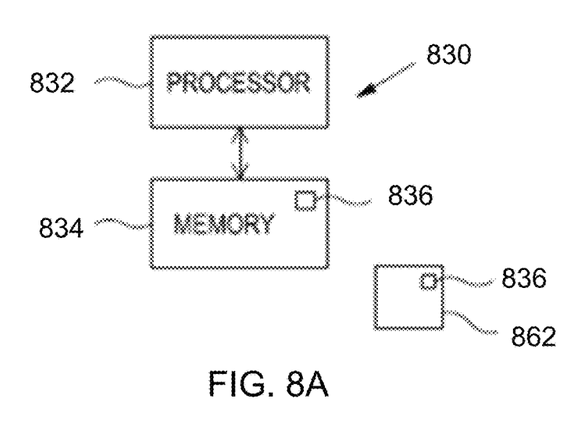
FIG. 8A shows another example of the subject matter described herein.
Figure 8B:
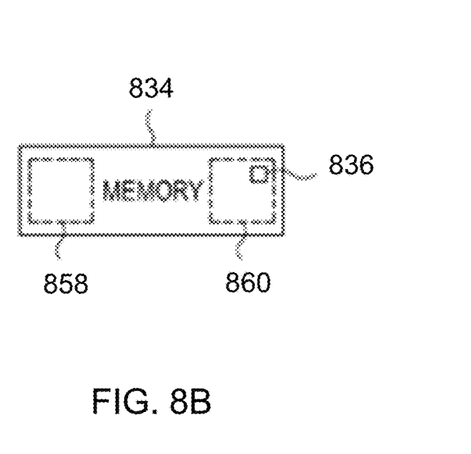
FIG. 8B shows another example of the subject matter described herein.

FIGS. 8A and 8B illustrate an example of a controller 830 suitable for use in an apparatus 10. The controller 830 can be a controller 830 of a signal repeater, for example a network-controlled repeater 68.

Implementation of a controller 830 may be as controller circuitry. The controller 830 may be implemented in hardware alone, have certain aspects in software including firmware alone or can be a combination of hardware and software (including firmware).

As illustrated in FIGS. 8A and 8B the controller 830 may be implemented using instructions that enable hardware functionality, for example, by using executable instructions of a computer program 836 in a general-purpose or special-purpose processor 832 that may be stored on a computer readable storage medium (disk, memory etc.) to be executed by such a processor 832.

The processor 832 is configured to read from and write to the memory 834. The processor 832 may also comprise an output interface via which data and/or commands are output by the processor 832 and an input interface via which data and/or commands are input to the processor 832.

The memory 834 stores a computer program 836 comprising computer program instructions (computer program code) that controls the operation of the apparatus 10 when loaded into the processor 832. The computer program instructions, of the computer program 836, provide the logic and routines that enables the apparatus to perform the methods illustrated in the accompanying Figs. The processor 832 by reading the memory 834 is able to load and execute the computer program 836.

The apparatus 10 comprises:
at least one processor 832; and
at least one memory 834 including computer program code 836,
the at least one memory storing instructions that, when executed by the at least one processor 832, cause the apparatus at least to:
  receiving, in a first signal pathway 14, at least a first signal 16 at a receiving frequency and associated with a first radio wave characteristic;
  receiving, in a second signal pathway 20, at least a second signal 22 at the receiving frequency and associated with a second, different radio wave characteristic;
  changing the frequency of at least one of the first and second signals 16, 22 to provide intermediate first and second signals 26, 28 such that the intermediate first and second signals 26, 28 have different frequencies;
  multiplexing the intermediate first and second signals 26, 28 to allow the intermediate first and second signals 26, 28 to be transmitted together via a single wired connection 34;
  receiving a multiplexed signal 36 via the single wired connection 34, the multiplexed signal 36 comprising intermediate third and fourth signals 38, 40 having different frequencies, the intermediate third signal 38 associated with a third radio wave characteristic and the intermediate fourth signal 40 associated with a fourth radio wave characteristic, different to the third radio wave characteristic; and
  separating the intermediate third and fourth signals 38, 40 into separate signals;
  changing the frequency of at least one of the intermediate third and fourth signals 38, 40 to provide third and fourth signals 46, 48 at a transmission frequency;
  transmitting, in the first signal pathway 14, the third signal 46; and
  transmitting, in the second signal pathway 20, the fourth signal 48.

As illustrated in FIGS. 8A and 8B, the computer program 836 may arrive at the apparatus 10 via any suitable delivery mechanism 862. The delivery mechanism 862 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 836. The delivery mechanism may be a signal configured to reliably transfer the computer program 836. The apparatus 10 may propagate or transmit the computer program 836 as a computer data signal.

The computer program instructions may be comprised in a computer program, a non-transitory computer readable medium, a computer program product, a machine readable medium. In some but not necessarily all examples, the computer program instructions may be distributed over more than one computer program.

Although the memory 834 is illustrated as a single component/circuitry it may be implemented as one or more separate components/circuitry some or all of which may be integrated/removable and/or may provide permanent/semi-permanent/dynamic/cached storage.

In examples the memory 834 comprises a random-access memory 858 and a read only memory 860. In examples the computer program 836 can be stored in the read only memory 858. See, for example, FIG. 8B.

In examples the memory 834 can be split into random access memory 858 and read only memory 860.

Although the processor 832 is illustrated as a single component/circuitry it may be implemented as one or more separate components/circuitry some or all of which may be integrated/removable. The processor 832 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

In this description, the wording 'couple' and their derivatives mean operationally connected in communication. It should be appreciated that any number or combination of intervening components can exist (including no intervening components), i.e., so as to provide direct or indirect coupling.

The term 'a', 'an' or 'the' is used in this document with an inclusive not an exclusive meaning. That is any reference to X comprising a/an/the Y indicates that X may comprise only one Y or may comprise more than one Y unless the context indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one memory configured to store instructions; and
   at least one processor configured to execute the instructions and cause the apparatus to perform,
   receiving, in a first signal pathway, at least a first signal at a receiving frequency and associated with a first radio wave characteristic;
   receiving, in a second signal pathway, at least a second signal at the receiving frequency and associated with a second, different radio wave characteristic;
   changing the frequency of at least one of the first signal and the second signal to provide an intermediate first signal and an intermediate second signal such that the intermediate first signal and the intermediate second signal have different frequencies;
   multiplexing the intermediate first signal and the intermediate second signal to allow the intermediate first signal and the intermediate second signal to be transmitted together via a single wired connection;
   receiving a multiplexed signal via the single wired connection, the multiplexed signal comprising an intermediate third signal and an intermediate fourth signal having different frequencies, the intermediate third signal associated with a third radio wave characteristic and the intermediate fourth signal associated with a fourth radio wave characteristic, different to the third radio wave characteristic; and
   separating the intermediate third signal and the intermediate fourth signal into separate signals;
   changing the frequency of at least one of the intermediate third signal and the intermediate fourth signal to provide a third signal and a fourth signal at a transmission frequency;
   transmitting, in the first signal pathway, the third signal; and
   transmitting, in the second signal pathway, the fourth signal,
   the receiving frequency being in a range from 21 GHz to 71 GHz, and
   the apparatus, to perform the changing the frequency of at least one of the first signal and the second signal, is caused to perform,
      downconverting the first signal to a first intermediate frequency lower than the receiving frequency; and
      downconverting the second signal to a second intermediate frequency lower than the receiving frequency and different to the first intermediate frequency.

2. The apparatus as claimed in claim 1, wherein the first intermediate frequency and the second intermediate frequency are in a range from 3 GHz to 10 GHz.

3. The apparatus as claimed in claim 1, wherein the first radio wave characteristic comprises a first polarisation and the second, different radio wave characteristic comprises a second, different polarisation.

4. The apparatus as claimed in claim 1, wherein the third radio wave characteristic comprises a first polarisation and the fourth radio wave characteristic comprises a second, different polarisation.

5. The apparatus as claimed in claim 1, wherein
   the transmission frequency is in a range from 21 GHz to 71 GHz, and
   the apparatus is further caused to, upconvert the frequency of the intermediate third signal to the transmission frequency; and
upconvert the frequency of the intermediate fourth signal to the transmission frequency.

6. The apparatus as claimed in claim 5, wherein the frequencies of the intermediate third signal and the intermediate fourth signal are in a range from 3 GHz to 10 GHz.

7. The apparatus as claimed in claim 3, wherein
the multiplexed signal comprises an oscillating signal, and
the apparatus is further caused to separate the intermediate third signal, the intermediate fourth signal, and the oscillating signal into separate signals.

8. The apparatus as claimed in claim 1, wherein
the apparatus is further caused to perform providing an oscillating signal, and
the apparatus is further caused to
multiplex the oscillating signal, the intermediate first signal and the intermediate second signal to allow the oscillating signal, the intermediate first signal and the intermediate second signal to be transmitted together via the single wired connection.

9. A network-controlled repeater comprising:
a backhaul unit; and
an access unit, wherein the backhaul unit and the access unit are connected via a single wired connection,
the backhaul unit including,
at least one first memory configured to store first instructions; and
at least one first processor configured to execute the first instructions and cause the backhaul unit to perform,
receiving, in a first signal pathway, at least a first signal at a receiving frequency and associated with a first radio wave characteristic;
receiving, in a second signal pathway, at least a second signal at the receiving frequency and associated with a second, different radio wave characteristic;
changing the frequency of at least one of the first signal and the second signal to provide an intermediate first signal and an intermediate second signal such that the intermediate first signal and the intermediate second signal have different frequencies;
multiplexing the intermediate first signal and the intermediate second signal to allow the intermediate first signal and the intermediate second signal to be transmitted together to the access unit via the single wired connection;
receiving a multiplexed signal from the access unit via the single wired connection, the multiplexed signal comprising an intermediate third signal and an intermediate fourth signal having different frequencies, the intermediate third signal associated with a third radio wave characteristic and the intermediate fourth signal associated with a fourth radio wave characteristic, different to the third radio wave characteristic;
separating the intermediate third signal and the intermediate fourth signal into separate signals;
changing the frequency of at least one of the intermediate third signal and the intermediate fourth signal to provide a third signal and a fourth signal at a transmission frequency;
transmitting, in the first signal pathway, the third signal; and
transmitting, in the second signal pathway, the fourth signal,
the receiving frequency being in a range from 21 GHz to 71 GHZ, and
the backhaul unit, to perform the changing the frequency of at least one of the first signal and the second signal, is caused to perform,
downconverting the first signal to a first intermediate frequency lower than the receiving frequency; and
downconverting the second signal to a second intermediate frequency lower than the receiving frequency and different to the first intermediate frequency, and
the access unit including,
at least one second memory configured to store second instructions; and
at least one second processor configured to execute the second instructions and cause the access unit to perform,
receiving, in a third signal pathway, at least the third signal at the receiving frequency and associated with the third radio wave characteristic;
receiving, in a fourth signal pathway, at least the fourth signal at the receiving frequency and associated with the fourth, radio wave characteristic different to the third radio wave characteristic;
changing the frequency of at least one of the third signal and the fourth signal to provide the intermediate third signal and the intermediate fourth signal such that the intermediate third signal and the intermediate fourth signal have different frequencies;
multiplexing the intermediate third signal and the intermediate fourth signal to allow the intermediate third signal and the intermediate fourth signal to be transmitted together to the backhaul unit via the single wired connection;
receiving a multiplexed signal from the backhaul unit via the single wired connection, the multiplexed signal comprising the intermediate first signal and the intermediate second signal having different frequencies, the intermediate first signal associated with the first radio wave characteristic and the intermediate second signal associated with the second radio wave characteristic, different to the first radio wave characteristic; and
separating the intermediate first signal and the intermediate second signal into separate signals;
changing the frequency of at least one of the intermediate first signal and the intermediate second signal to provide the first signal and the second signal at the transmission frequency;
transmitting, in the third signal pathway, the first signal; and
transmitting, in the fourth signal pathway, the second signal.

10. The network-controlled repeater as claimed in claim 9, wherein the single wired connection is a single coaxial cable.

11. The network-controlled repeater as in claim 9, wherein the access unit is further caused to perform providing an oscillating signal, wherein the multiplexing of the access unit multiplexes the oscillating signal, the intermediate third signal and the intermediate fourth signal to allow the oscillating signal, the intermediate third signal and the intermediate fourth signal to be transmitted to the backhaul unit together via the single wired connection.

12. The network-controlled repeater as claimed in claim 9, wherein the backhaul unit is configured to be positioned outside a building and the access unit is configured to be positioned inside the building.

13. A method comprising:
receiving, in a first signal pathway, at least a first signal at a receiving frequency and associated with a first radio wave characteristic;
receiving, in a second signal pathway, at least a second signal at the receiving frequency and associated with a second, different radio wave characteristic;
changing the frequency of at least one of the first signal and the second signal to provide an intermediate first signal and an intermediate second signal such that the intermediate first signal and the intermediate second signal have different frequencies;
multiplexing the intermediate first signal and the intermediate second signal to allow the intermediate first signal and the intermediate second signal to be transmitted together via a single wired connection;
receiving a multiplexed signal via the single wired connection, the multiplexed signal comprising an intermediate third signal and an intermediate fourth signal having different frequencies, the intermediate third signal associated with a third radio wave characteristic and the intermediate fourth signal associated with a fourth radio wave characteristic, different to the third radio wave characteristic;
separating the intermediate third signal and the intermediate fourth signal into separate signals;
changing the frequency of at least one of the intermediate third signal and the intermediate fourth signal to provide a third signal and a fourth signal at a transmission frequency;
transmitting, in the first signal pathway, the third signal; and
transmitting, in the second signal pathway, the fourth signal,
the receiving frequency being in a range from 21 GHz to 71 GHz, and
the changing the frequency of at least one of the first signal and the second signal includes,
downconverting the first signal to a first intermediate frequency lower than the receiving frequency; and
downconverting the second signal to a second intermediate frequency lower than the receiving frequency and different to the first intermediate frequency.

14. A non-transitory computer-readable medium storing instructions, which when executed by a processor, cause an apparatus including the processor to perform at least the method of claim 13.

* * * * *